May 3, 1966 C. B. MONK ETAL 3,248,836
EXTERNAL WALL PANEL AND WALL FORMED THEREFROM
Filed June 17, 1963 8 Sheets-Sheet 2

Inventors
S. Eugene Hubbard
Clarence B. Monk
Attorney

May 3, 1966  C. B. MONK ETAL  3,248,836
EXTERNAL WALL PANEL AND WALL FORMED THEREFROM
Filed June 17, 1963  8 Sheets-Sheet 7

Inventors
S. Eugene Hubbard
Clarence B. Monk by Donald L. Welsh
Attorney

United States Patent Office 3,248,836
Patented May 3, 1966

1

3,248,836
EXTERNAL WALL PANEL AND WALL FORMED
THEREFROM
Clarence B. Monk, St. Charles, Ill., and S Eugene Hubbard, Niles, Mich., assignors, by mesne assignments, to Structural Clay Products Institute, Geneva, Ill., a corporation of Delaware
Filed June 17, 1963, Ser. No. 289,169
4 Claims. (Cl. 52—434)

This invention relates to building panels adapted to be secured together to form a wall and the primary object is to provide a novel building panel which is easily secured to other similar panels, and to adjacent building parts of widely varying dimensions.

This application is a continuation-in-part of our copending application, Serial Number 789,211, now abandoned which in turn is a continuation-in-part of application, Serial Number 663,039, also now abandoned.

Another object is to provide a novel building panel enabling walls to be formed with a brick exterior at a lower cost than has been possible heretofore.

A more detailed object is to incorporate in each panel novel attaching and reinforcing enabling the panel to be formed of brick or similar building units.

Further objects and advantages of the present invention will become apparent as the following description of an illustrative embodiment proceeds, taken in conjunction with the accompanying drawings in which:

FIGURE 18 is an enlarged sectional view, partially

2 broken, illustrating how the panel clip serves as a retaining member to secure the panel to a shelf angle at the underside of a spandrel beam.

In FIGURES 1 to 24 of the drawings, the invention is shown for purposes of illustration embodied in a wall 10 comprising a plurality of panels 11 which are secured together at the building site after being formed separately at a remote location. To enable each panel to be formed of a plurality of building units such as brick 22, the invention contemplates spacing the units apart in a row with their corresponding edges in alignment and reinforcing the panel by providing a member 34 which extends substantially the full length of the panel and is embedded in the bonding material 28 securing the units together. Attachment of the panels to each other and the adjacent building parts is effected by a novel fastening means 31 which extends a substantial distance along the panel for attaching the panel to building parts of widely varying dimensions and is disposed beneath the exterior of the panel so as to avoid interference with such building parts.

Figure 1:
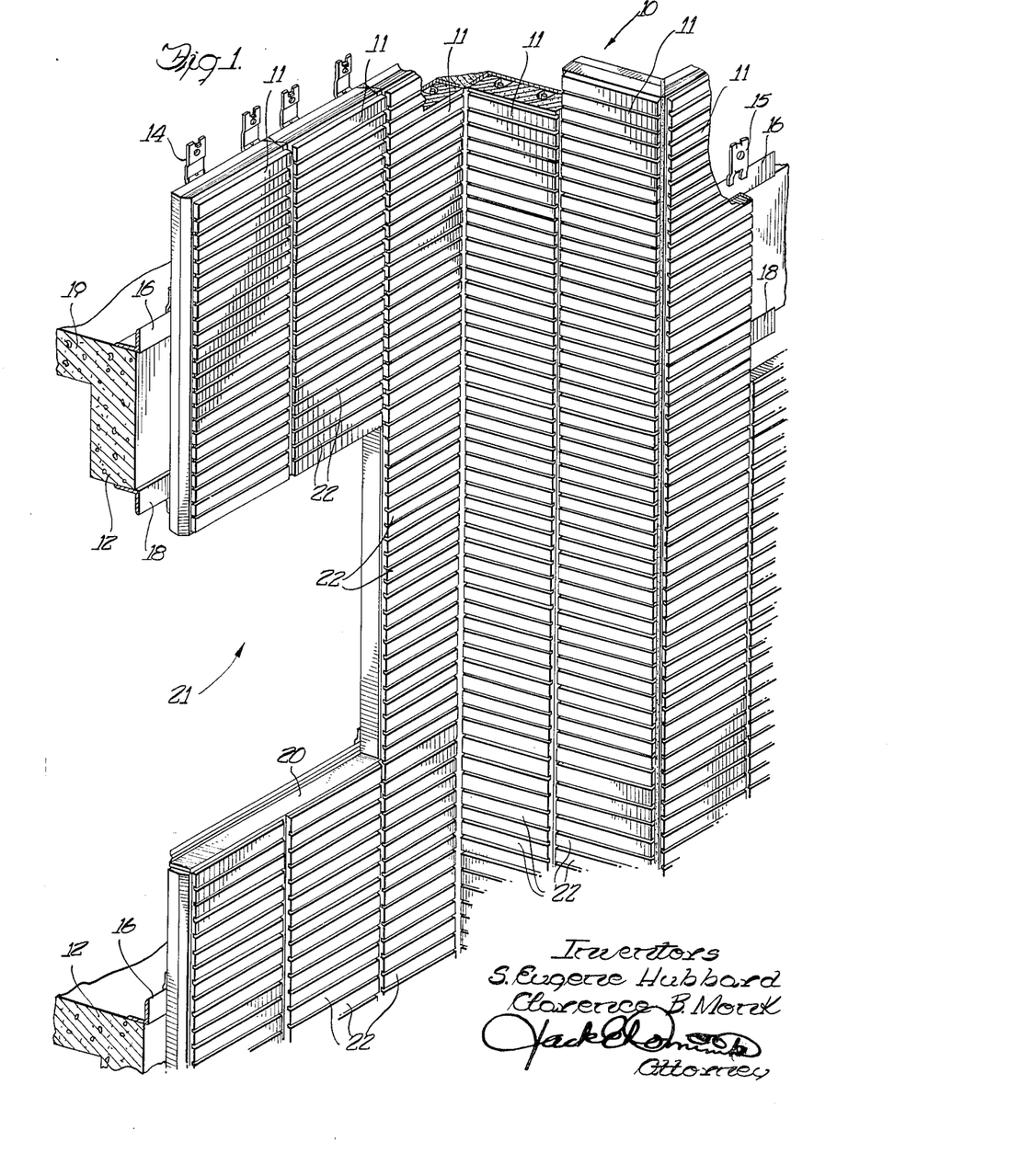
FIGURE 1 is a perspective partially broken view of a typical exterior wall illustrating one embodiment of the invention.

Referring to FIGURE 1, the panel sections 11 are shown as joined to each other and to the spandrel beams 12 by means of sill joint connectors 14 and panel clips 15. The panel clips 15 serve as a retaining element or a hanging element depending upon whether they are above or below the spandrel beam 12. An upper shelf angle 16 and a lower shelf angle 18 are respectively secured to the outer portion of the floor slab 19, and the outer lower edge of the spandrel beam 12. A sill joint flashing 20 is shown in the window opening 21, but may be continued throughout the length of the sill joint between adjoining panels 11.

As will be seen, each of the panels 11 contains a plurality of individual bricks 22 held in place in a stack bond relationship, that is, parallel to each other and spaced apart equal distances with their front faces lying in a common plane and with their corresponding ends in alignment. Although the external brick appearance is highly desirable and the preferred embodiment of the invention, it will be appreciated that other building units such as tile also may be used.

Figure 2:
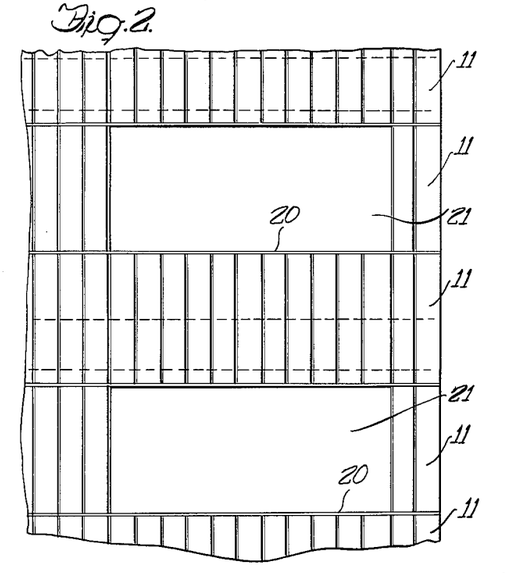
FIGURE 2 is a broken front elevation of a wall indicating how the pre-formed panels are oriented in relation to the respective floor beams.
Figure 3:
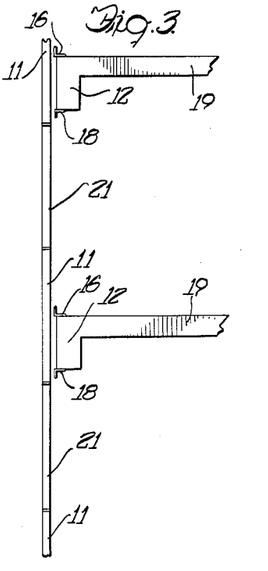
FIGURE 3 is an end view of the structure shown in FIGURE 2.

One modular arrangement of the panels 11 is illustrated in FIGURES 2 and 3. Referring first to FIGURE 3, it will be seen that the spandrel beams 12 and their respective floor slabs 19 have been fitted with upper and lower shelf angles 16, 18. The spandrel panels are arranged to traverse the depth of the spandrel beam 12, providing window openings 21 which are flanked by window panels of the same length as the spandrel panels. The modular length of the various panels 11 are determined when the story heights in the associated building structure are first arrived at.

Figure 4:
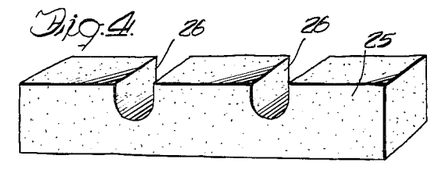
FIGURE 4 is a perspective view of a typical brick intended for use in a precast panel.
Figure 5:
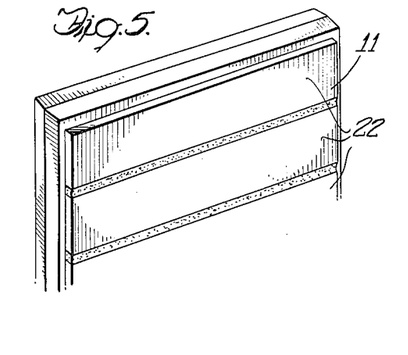
FIGURE 5 is a top perspective view showing a portion of a precast panel.
Figure 6:
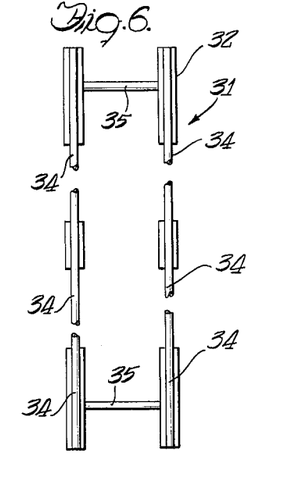
FIGURE 6 is a diagrammatic front elevation view, partially broken, showing the orientation and construction of the re-enforcing material used in the panel illustrated in FIGURE 5.

In the preferred embodiment of the invention the basic element of the panel 11 is a brick 25, such a typical brick being illustrated in FIGURE 4. There it will be seen that the brick 25 has a pair of exterior core holes 26, each such exterior core hole being U-shaped in cross section and being spaced from the end walls.

One brick shaped as shown in FIGURE 4 and found to be satisfactory was eleven inches long, two and one-quarter inches deep, and two and one-sixth inches high. The U-shaped exterior corings 26 are preferably generated about a five-eighths inch radius, the center of which is five-eighths inch from the rear of the brick and two and one-half inches from each end. In actual manufacture two such bricks are extruded at once having a total depth of four and one-half inches and then are wire cut parting at the face portion of the brick.

Figures 9, 10:
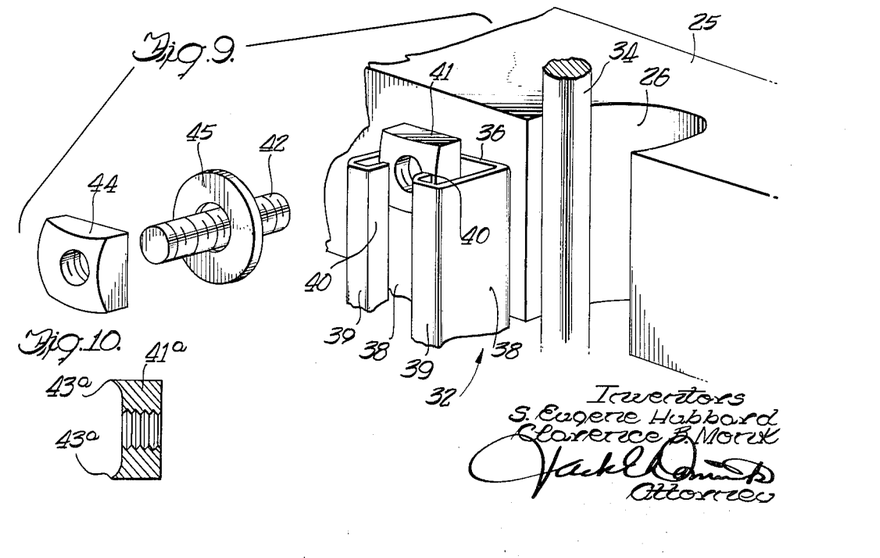
FIGURE 9 is an exploded perspective view of the attaching means associated with the panel.
FIGURE 10 is a sectional view of an alternative form of locking nut used in the mounting channel.
Figure 11:
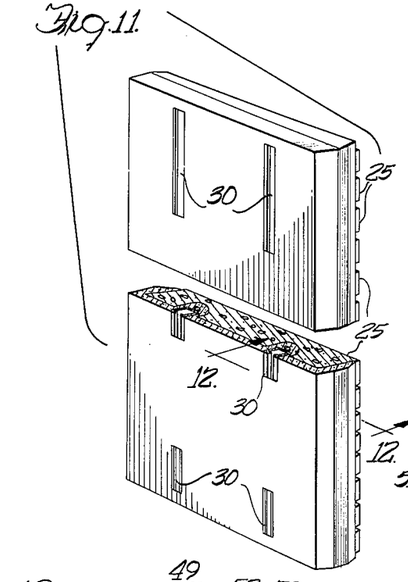
FIGURE 11 is a perspective year partial sectional view of a typical panel illustrating its interior elements.

As pointed out above, the panels are secured to various portions of the associated building construction, by means of clips and the connectors. As illustrated in FIGURE 9, a locking nut 41 is inserted through the channel slot 30 and then threadedly receives stud 42. The clip nut 44 is then secured to the outside end of locking bolt 42 with an interposed washer 45 if desirable in the particular application. Because of the possibility of vertical shifting, an alternative form locking nut 41a has been shown (FIGURE 10). This nut may be formed by punching, the shearing action leaving an exterior flange 43a which bites into the runner 40 when the locking bolt 42 is engaged.

Figure 12:
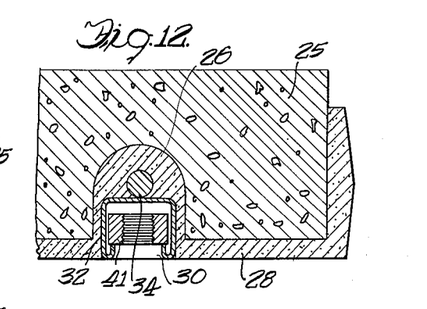
FIGURE 12 is a sectional view taken substantially on line 12—12 of FIGURE 11.

As will be seen in FIGURE 12, the re-enforcing rod 34 and channel 32 are secured in a matrix formed of cementitious backing material 28. In the process of casting the panels 11, sufficient gating is employed to prevent the slots 30 from filling. Thus the locking nut 41 may be inserted for use through the slot 30 in the channel member 32 as illustrated.

Figure 8:
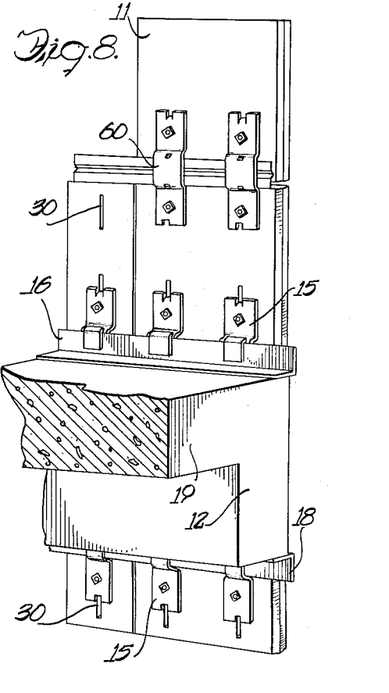
FIGURE 8 is a rear view of the panel and beam shown in FIGURE 7.
Figure 13:
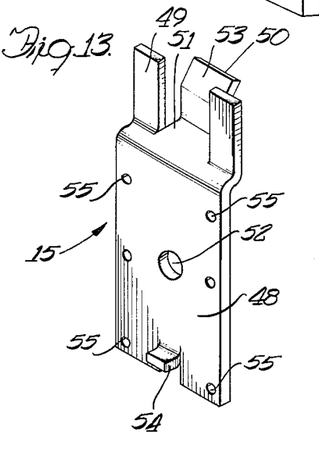
FIGURE 13 is a perspective view of a panel clip employed both for hanging and retaining.
Figure 14:
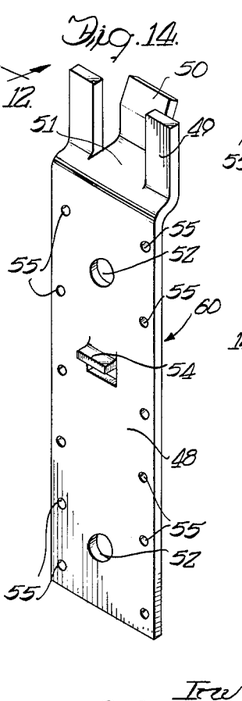
FIGURE 14 is a perspective view of an alternative form of retailing clip which may also serve as a joint connector.

In order to secure the panels 11 to the shelf angles the shelf angle clip 15 such as that shown in FIGURE 13 may be employed. The shelf angle clip 15 may serve as either a hanging clip on the upper shelf angle 16 or as a retaining clip on the lower shelf angle 18 (FIGURE 8). The shelf angle clip 15 has a substantially rectangular body portion 48 with a pair of offset forwardly extending lateral fingers 49. The fingers 49 flank a further offwet tab 50, the outer end of which is bent to diverge from the plane of the flanking fingers 49. The offset of the tab 50 provides a mounting shelf 51 which separates the fingers 49 and tab 50 by a space approximately equal to the thickness of the associated shelf angle 16, 18. A center hole 52 is provided in the body portion 48 in the shelf angle clip 15 to receive the locking bolt 42. At the lower central portion of the shelf clip 15 centering tab 54 is formed of a width proportioned to enter the slot 30 of the associated mounting channel 32. The centering tab 54 extends on the opposite side of the body portion 48 from the offsets accorded the mounting fingers 49 and mounting tab 50. A plurality of border holes 55 are provided in the body portion 48 of the clip for securing furring strips in place.

The panel clip and joint connector 60 contains almost all of the elements described in the self angle clip 15. As will be seen in FIGURE 14 the panel clip and joint connector 60 has a pair of flanking fingers 49 at its upper portion and an intermediate tab 50 with a mounting shelf 51. A central mounting hole 52 and centering tab 54 with flanking furring holes 55 are also provided. The body portion 48, however, is extended substantially below the centering tab 54 and a second locking bolt through hole 52 is provided. The panel clip and joint connector 60 approximately doubles the length of the shelf angle clip 15.

Figure 15:
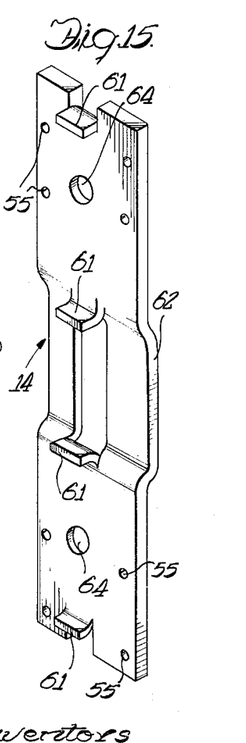
FIGURE 15 is a perspective view of a sill joint connector.

The sill joint connector 14 is normally formed as a punching from strap stock, in a manner similar to the shelf angle clip 15 and the panel clip and joint connector 60. Centering tabs 61 are provided at both ends of the sill joint connector 14 as well as at intermediate central portions of the sill joint connector. An intermediate offset portion 62 is provided between the two central centering tabs 61. The purpose of the offset is to accommodate the flashing which may be employed at the sill joint in a manner to be described in greater detail later. Upper and lower locking bolt holes 64 are provided to receive the associated locking bolt 42. As with the shelf angle clip 15 and panel clip and connector 60, a plurality of furring strip holes 55 are provided around the periphery of the sill joint connector 14.

Figure 16:
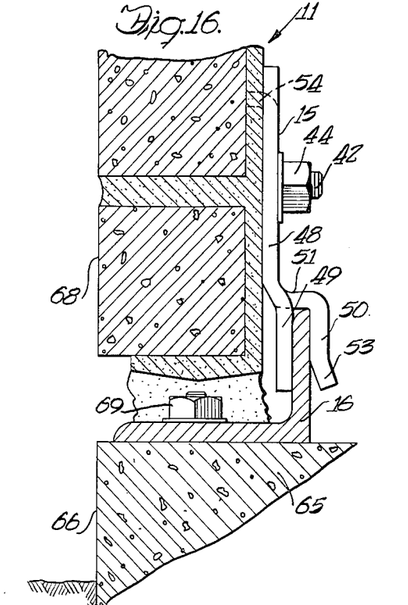
FIGURE 16 is an enlarged partially broken sectional view illustrating how a panel is attached to a grade slab.
Figure 17:
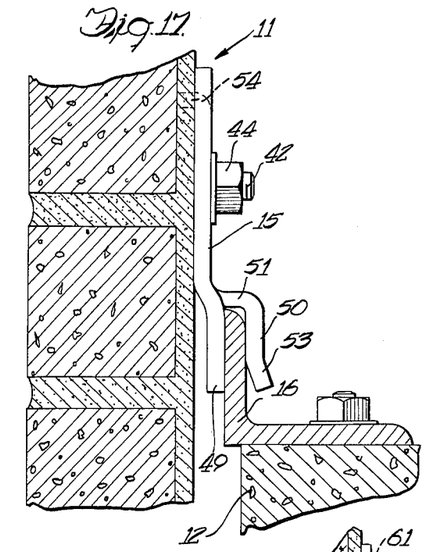
FIGURE 17 is an enlarged partially broken sectional view illustrating how the hanger clip is employed to secure the panel to a shelf angle.
Figure 18:
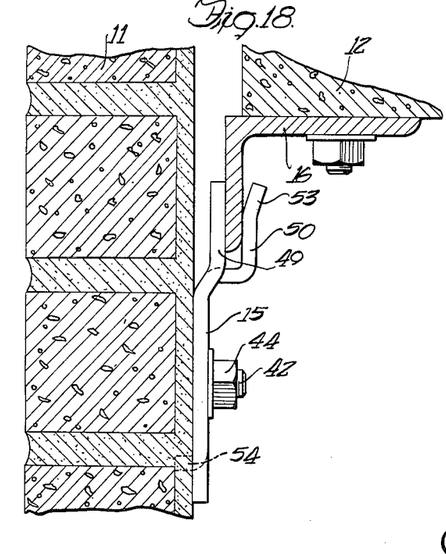

The details of construction of the shelf angle clip 15, panel clip and connector 60, and sill connector 14, will be even more thoroughly appreciated as their operational characteristics and usages are described. In FIGURE 16 the shelf angle clip 15 is attached to its associated panel 11 by means of the locking bolt 42 and nut 44 which co-act with the locking nut and channel runners (not shown) to securely fix the shelf angle clip body 48 to the panel 11. The centering tab 54 rides within the channel slot, and with the locking bolt 42, provides two fixed points to prevent twisting of the clip 15 with relation to the panel. The shelf angle 16 is mounted on a grade slab 65 in such a manner that the outer face of the grade slab 66 is flush with the outer face 68 of the panel 11. A conventional bolt and nut assembly 69 is employed to secure the shelf angle 16 to the grade slab 65.

Where the panel is to be mounted to a spandrel beam 12, such as illustrated in FIGURE 17, the shelf angle 16 is reversed so that its upstanding leg extends slightly beyond the outer face of the spandrel beam 12. As in the installation described above on a grade slab the upstanding leg of the shelf angle 16 is engaged between the bars of fingers 49 and mounting tab 50. The offset end portion 53 of the mounting tab 50 permits easy insertion of the upstanding leg of the shelf angle into the pocket defined by the fingers 49 and mounting tab 50. The shelf angle upstanding edge extends into the pocket until it approaches a position where it would abut the shelf 51.

Where the shelf angle clip 15 is employed in its inverted position as a retaining clip, as illustrated in FIGURE 18, its structural relationship with the elements of the two assemblies discussed above is almost identical except that its gravitational position is inverted. Referring now to FIGURE 18, it will be seen that the shelf angle 16 is mounted on the underside of the spandrel beam 12 at a slight offset to the front face of the spandrel beam 12. The mounting tab 50 and mounting fingers 49 engage the dependent edge of the shelf angle 16 in the same manner as described above. Similarly the locking bolt and nut assemblies engage the panel 11 and are secured against rotation by the centering tab 54.

The shelf angle clip 15, in a sense, serves an intermediate role along the panel, except where the panel ends at a grade slab as shown in FIGURE 16.

Figure 7:
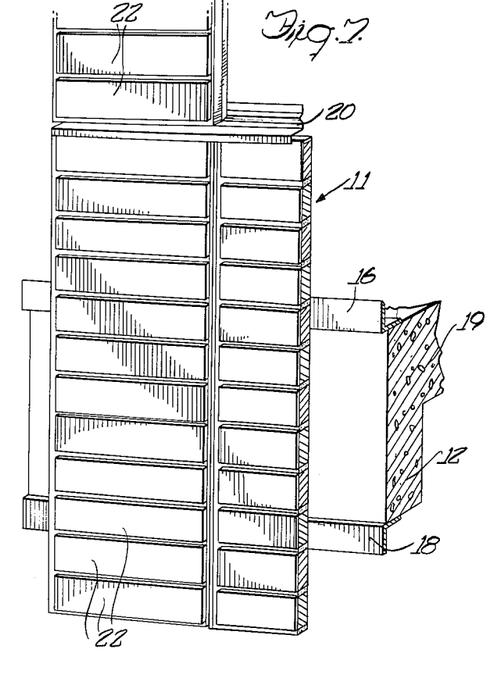
FIGURE 7 is a partially broken perspective view illustrating how the panels are attached to a spandrel beam.
Figure 19:
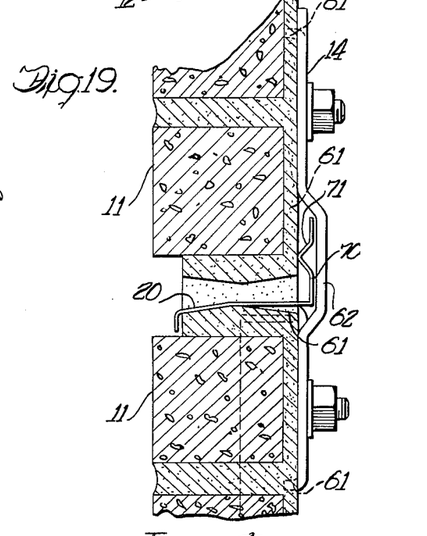
FIGURE 19 is an enlarged partially broken sectional view of a sill joint illustrating the use of the sill joint connector and an associated sill joint flashing.

As the panels are erected vertically along the side of a building, a plurality of sill joints are effected. In the front elevation such a sill joint is shown in FIGURE 7, and the rear of the sill joint as well as the shelf angle applications are shown in FIGURE 8. The details of the sill joint are best shown in FIGURE 19. There it will be seen that the two panels 11 are hung from the associated building structure in spaced relation to each other. To prevent rain water and the like from leaking through the panels, and to facilitate sealing the joint, a unique flashing is provided which conforms to the upper end of the lower panel and then extends upwardly in the form of a locking lug 70 with a locking detent 71. The flashing offset 62 of the connector 14 is proported to accommodate the locking leg and its associated detent of the flashing 20. The four centering tabs 61 serve to secure the upper and lower body portions of the connector against rotation by their respective engagements with the channel slot 30.

Figures 20, 21, 22, 23, 24:
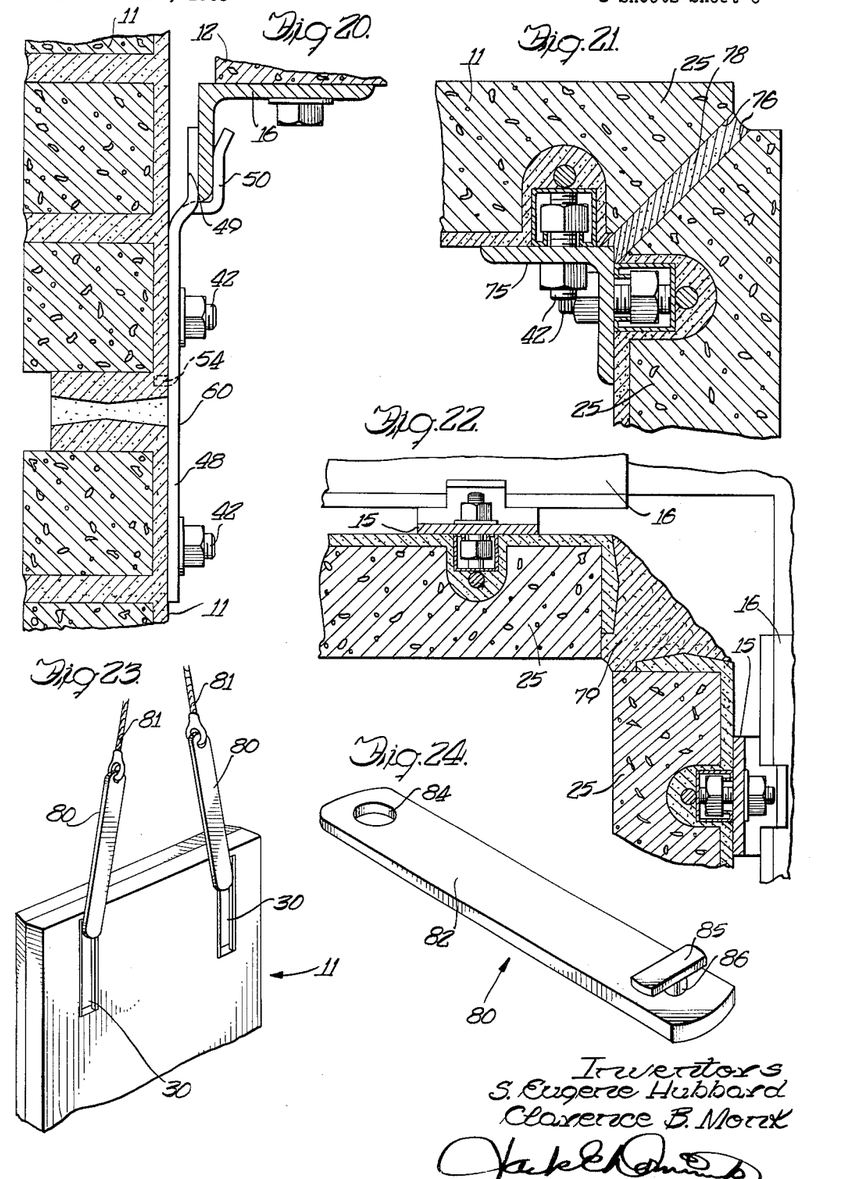
FIGURE 20 is an enlarged partially broken sectional view illustrating how the panel clip and joint connector shown in FIGURE 14 is employed in the two-fold capacity as a retainer and joint connector.
FIGURE 21 is a transverse sectional view of a portion of a salient corner joint illustrating how the respective panels are secured to a common angle support.
FIGURE 22 is an enlarged partially broken transverse sectional view illustrating an interior or re-entrant corner joint and showing how the respective panels are secured to such a joint.
FIGURE 23 is a perspective partially broken view showing how a pair of panel hoist hooks are used to hoist the individual panels to their installation station.
FIGURE 24 is an enlarged perspective view of one of the hoist hooks illustrated in FIGURE 23.

In those instances where flashing is not necessarily required, and an end joint occurs adjacent the spandrel beam, the panel clip and connector 60 is employed. Referring now to FIGURE 20, it will be seen that the mounting tab 50 and the flanking mounting fingers 49 engage the dependent leg of the shelf angle 16. Two locking bolts 42 above and below the end joints are provided to secure the body portion 48 of the clip connector 60 to the adjacent panels 11. The centering tab 54 secures the unit to the upper panel. If desired, a second centering tab may be provided at the lower end of the body portion 48 to engage the channel slot opening in the lower panel 11.

Corner joints are accomplished as illustrated in FIGURES 21 and 22. At an outside corner, such as shown in FIGURE 21, a vertical corner angle 75 is erected to receive the staggered locking bolts 42. The ends of the bricks 25 present angled faces 76 which leave a corner slot 78 which is grouted or otherwise sealed, being backed up by the corner angle piece 75.

The interior or re-entrant corner construction is illustrated in FIGURE 22. There the panels 11 are mounted in conventional manner with their face portions approximating a right angle. The corner portion is then grouted as at 79 to seal the adjacent joint between the corner portions of the panels.

To raise the panel 11 to its intended position on the building structure, a pair of panel hooks 80 are attached to cables 81 and inserted into the upper slots 30 of a panel to carry the unit to any desired height. The hook 80, illustrated in FIGURE 24, has a flat stock body portion 82 with a cable eye hole 84 bored in one end and a mounting tab 85 at its other end. The mounting tab 85 is positioned with its own axis perpendicular to the long axis of the hook body 82, and is secured to the hook body 82 by means of a support post 86 which is of a diameter approximating the width of the channel slot 30. The width of the mounting tab 85 similarly approximates the width of the channel slot 30 thereby permitting the mounting hook 80 to be locked in place when in operation but easily released from the channel and panel by twisting when the tension on the cable hoist is released.

The preferred handling and erection technique contemplates first mounting the shelf angles 16 and 18 on the spandrel beam 19 as by fittings cast in the beam. Precise orienting of the upper shelf angle 16 is the key to good results and facilitates the subsequent operations. The orienting is accomplished by leveling all the upper shelf angles with reference to a common zero point. The lower shelf angles 18 need not be as accurately positioned except to have their faces positioned in the same plane as the faces of the upper shelf angles. With the angles positioned, the upper retaining clips 15 are attached to the panel channels and precisely gauged so that all panels will be uniformly vertically positioned on the spandrels 19. The panels are then hoisted into position with the aid of the above described panel hooks 80 with the clips hooked over the vertical leg of the top angle 16. The lower clips are attached to the panel so as to hook the lower angle. When a wall length of panels has been positioned they are laterally adjusted to provide uniform spacing between panels.

To install the filler panels between previously erected spandrel panels sill joint connectors 60 are attached to the bottom of the filler panels, the panels are hoisted in place, the sill joint connectors attached to the lower spandrel panel and sill joint connectors attached to both the top of the filler panel and the spandrel panel thereabove. The attachments then tightened and the clips welded to the angles on the spandrel beams. Flashing may be inserted as desired, most probably between the filler panel and spandrel panel thereabove.

The joints are weatherproof sealed by any satisfactory means such as mortar or grout which can be proficiently applied by using an extrusion gun. In the embodiments illustrated the edges of the panels are formed in a flat V shape to facilitate the application of mortar and to strengthen the mechanical bond between mortar and panel.

Figure 25:
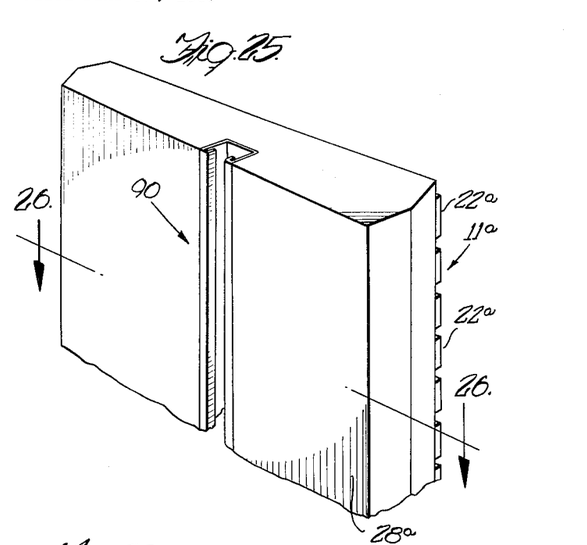
FIGURE 25 is a fragmentary perspective view similar to FIGURE 11 and showing a modified panel construction.
Figure 26:
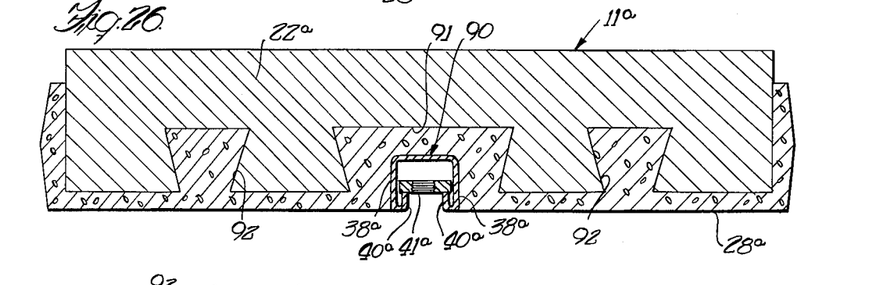
FIGURE 26 is a sectional view of the modified construction taken along the line 26—26 of FIGURE 25.
Figure 27:
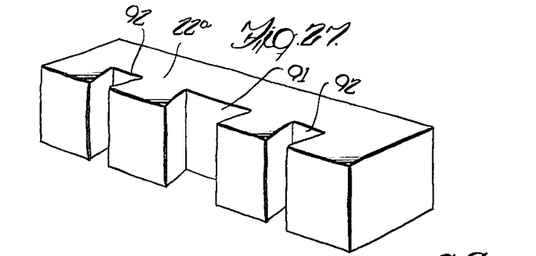
FIGURE 27 is a perspective view of one of the bricks used in the modified panel.

Instead of being formed separately and then joined together as described above, the reinforcing member 34 and the fastening means 31 may be made integral with each other as parts of a single bar 90 of channel cross section. This modified construction is shown in FIGURES 25 to 27 and is made possible by extending the channel substantially the full length of the panel 11a. With the single reinforcing and attaching channel, the preferred location is at the center of the panel. For this location, each brick 22a is formed with a central rearwardly opening recess 91 which, in the finished panel, is aligned with the corresponding recesses in the other bricks to receive the channel. Although a single steel channel of a substantial cross sectional area has been found to strengthen the brick and bonding material 28a and provide the desired resistance to compression, tension and lateral bending forces applied to the panel, it may be desired in some instance to provide additional reinforcement. For this purpose, each brick is formed with two additional rearwardly opening recesses 92 located between the ends of the brick and the central recess 91 to receive additional reinforcement bars (not shown).

Attachment of the modified panel 11a of FIGURES 25 to 27 to parts of a building is effected in a manner similar to the construction of FIGURES 1 to 24 with a locking member 41a fitting in the channel 90 and abutting the inwardly facing flanges 40a on the channel legs 38a. Since the channel extends substantially the full length of the panel, this attachment may be effected with building parts of widely varying dimensions and the necessity for precision is avoided. Regarding each construction, it will be seen that the panel and resulting wall are inexpensive, rugged, decorative and widely adaptable to different building configurations. Not only can the panels be fabricated by high speed production techniques, but assembly at the building site may be effected quickly and easily. In addition to a brick exterior, the improved panels, being made of brick and mortar, also provide desirable fireproof qualities in the wall.

Figure 28:
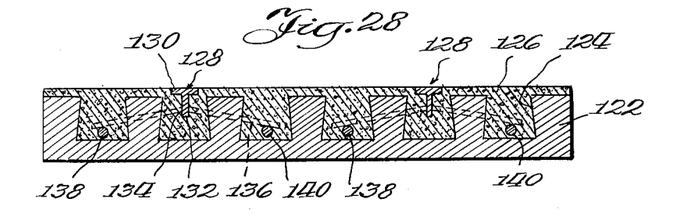
FIGURE 28 is a sectional plan view of another modified form of the present invention.
Figures 29, 31:
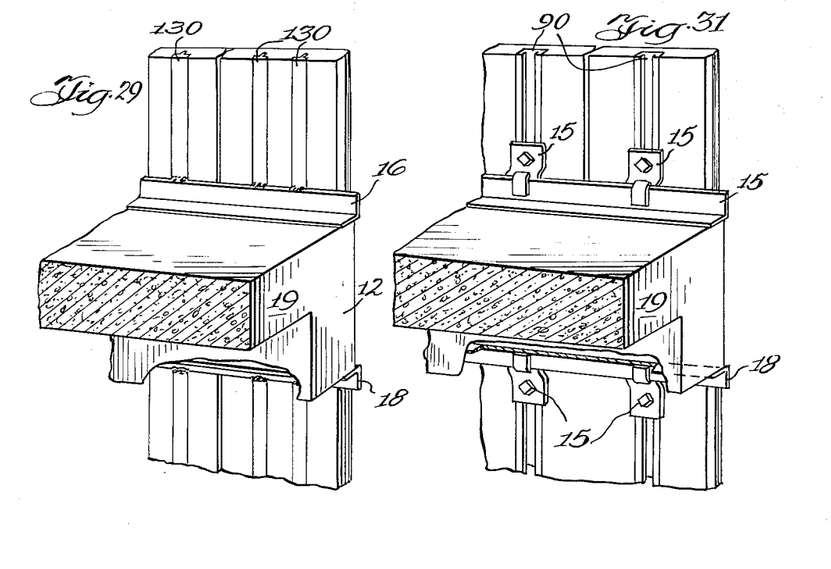
FIGURE 29 is a fragmentary view in perspective of the structural unit of FIGURE 28 shown in assembled relation with respect to a building structural element.
FIGURE 31 is a fragmentary view in perspective of the structural unit of FIGURE 30 shown in assembled relation with respect to a structural element of a building.

In FIGURE 28 is shown a modified form of the present invention in which a structural unit 112 which is formed with a plurality of tenon shaped recesses 124 at the rear face thereof. Within the recesses 124 cementitious bonding material 126 is received. The bonding material 126 extends beyond the rear face of the unit 122 as shown in FIGURE 28. Embedded in the bonding material 126 are a plurality of reinforcing assemblies 128. Each of the reinforcing bars 128 comprises an elongated T-bar 130 having a leg 132 extending into one of the recesses 124. The leg 132 is formed with a plurality of longitudinally spaced openings 134, within each of which is received a reinforcing bar 136 which may be spot welded to the leg 132 at the opening 134. Secured to the outer ends of the bar 136, as by welding or the like, are longitudinally extending reinforcing bars 138 and 140. The bars 138 and 140 are embedded in the bonding material in the next adjacent recesses 124 from the recesses in which the leg 132 is received. A principal advantage of the structural unit of the form of the invention shown under FIGURE 28 is that the exposed surface of each of the T-bars 130 may be conveniently welded to a structural member of a building as shown clearly in FIGURE 29.

Figures 30, 32:
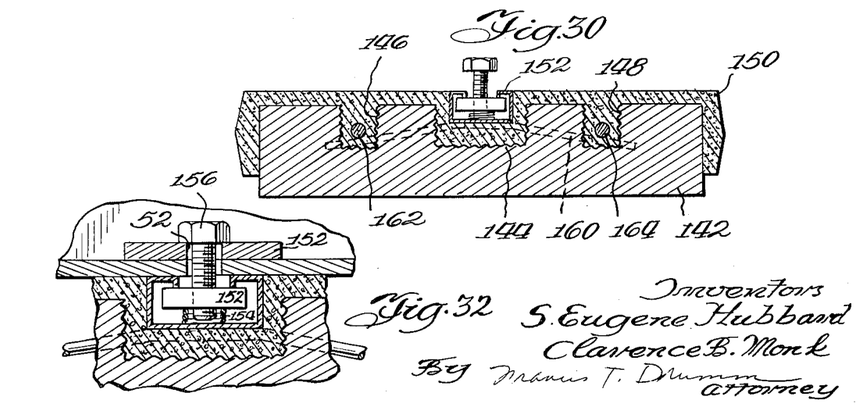
FIGURE 30 is a sectional plan view of a further modified form of the present invention.
FIGURE 32 is a fragmentary enlarged sectional plan view of certain details of the structural unit illustrated in FIGURE 30.

In FIGURE 30 is shown a further modified form of the present invention in which a structural unit 142 is formed at the rear face thereof with a centrally located elongated central recess 144 and recesses 146 and 148 located between the central recesses 144 and either of the ends. Bonding material 150 is received within recesses 144, 146 and 148, extends beyond the rear surface of the unit 142 along the end surfaces, as illustrated. Within the bonding material 150 is embedded an elongated channel-shaped bar 152 similar to the bar 90 in the form of the invention illustrated in FIGURES 25 and 26. A plurality of nuts 152 are disposed within the channel-bar 152 and are maintained in position by means of springs 154. Within each of the nuts 152 is threadedly received a cap screw 156, which passes through an opening 52 of the clip 15. Secured to the lower face of the bar 90, as viewed in FIGURES 30 and 32, as by welding or the like, are a plurality of substantial V-shaped reinforcing bars 160. A pair of elongated reinforcing rods 162 and 164 are received in the recesses 140 and 148 respectively. The spaced reinforcing rods 160 are secured as by welding or the like to the reinforcing bars 162 and 164.

We claim as our invention:

1. A prefabricated wall panel comprising a plurality of masonry units arranged in spaced parallel relation in a row, each of said units being substantially rectangular in configuration and having top and bottom surfaces, spaced parallel side surfaces and spaced parallel end surfaces, each of said units having a plurality of transversely extending grooves in one of said side surfaces, said units being set in a cementitious matrix with the grooves of said units in alignment each with the other an elongated T-bar embedded in said matrix with the base thereof exposed, a pair of elongated reinforcing rods disposed in adjacent grooves of said panel a plurality of spaced reinforcing bars extending transversely of said panel and secured to said T-bar and to said elongated reinforcing bars, whereby flexing of said panels is minimized.

2. A panel in accordance with claim 1 wherein a plurality of openings are formed in a leg of said T-bar and wherein said lastnamed reinforcing bars are received in said openings.

3. A prefabricated wall panel comprising a plurality of masonry units arranged in spaced parallel relation in a row, each of said units being substantially rectangular in configuration and having top and bottom surfaces, spaced parallel side surfaces and spaced parallel end surfaces, each of said units having a plurality of transversely extending grooves in one of said side surfaces, said units being set in a cementitious matrix with the grooves of said units in alignment each with the other an elongated channel member embedded in said matrix to form an elongated slot an elongated reinforcing bar embedded in said matrix in each adjacent groove of said panel, and a plurality of reinforcing bars extending transversely of said panel and spaced longitudinally with respect thereto within said matrix and secured to said channel member and said elongated reinforcing bars whereby flexing of said panel is minimized.

4. A prefabricated wall panel comprising a plurality of masonry units arranged in spaced parallel relation in a row, each of said units being substantially rectangular in configuration and having top and bottom surfaces, spaced parallel side surfaces and spaced parallel end surfaces, each of said units having a plurality of transversely extending grooves in one of said side surfaces, said units being set in a cementitious matrix with said transverse grooves aligned with each other to define a groove extending the full length of said row, a reinforcing bar embedded in said matrix and lying in and extending substantially the full length of said groove and providing exposed surfaces for attachment to fastening devices at different points along its length, an elongated reinforcing bar embedded in said matrix in each adjacent groove of said panel, and a plurality of reinforcing bars extending transversely of said panel and spaced longitudinally with respect thereto within said matrix and secured to said channel member and said elongated reinforcing bars whereby flexing of said panel is minimized.

References Cited by the Examiner

UNITED STATES PATENTS

| | | | |
|---|---|---|---|
| 1,430,931 | 10/1922 | Blackall | 52—173 |
| 1,750,841 | 3/1930 | Hopper et al. | 52—700 |
| 1,781,794 | 11/1930 | Tappan | 52—489 |
| 1,997,809 | 4/1935 | Cole | 52—281 |
| 2,001,162 | 5/1935 | Strauss | 52—289 |
| 2,029,878 | 2/1936 | Kublanow | 52—385 |
| 2,044,382 | 6/1936 | Dunagan | 52—433 |
| 2,053,873 | 9/1936 | Niederhofer | 52—213 |
| 2,282,829 | 5/1942 | Schurman | 52—434 |
| 2,345,650 | 4/1944 | Attwood | 52—710 |
| 2,480,241 | 8/1949 | Hensel | 52—486 XR |
| 2,881,613 | 4/1959 | Taylor et al. | 52—479 |
| 3,162,982 | 12/1964 | Monk | 52—434 |

FOREIGN PATENTS 824,911  11/1937  France.

FRANK L. ABBOTT, Primary Examiner.

HENRY C. SUTHERLAND, Examiner.

J. L. RIDGILL, Assistant Examiner.